United States Patent Office 3,245,754
Patented Apr. 12, 1966

3,245,754
PREPARATION OF CYANOGEN CHLORIDE
Wilhelm Gruber, Darmstadt, Germany, assignor to Röhm & Haas G.m.b.H., Darmstadt, Germany
No Drawing. Filed Feb. 28, 1963, Ser. No. 261,883
Claims priority, application Germany, Mar. 10, 1962,
R 32,260
9 Claims. (Cl. 23—14)

This invention relates to methods for the preparation of cyanogen chloride, CNCl.

Cyanogen chloride is a fugitive, poisonous, easily crystallizable compound having commercial use per se or in the synthesis of cyanuric chloride, $(CNCl)_3$. In the prior art, cyanogen chloride is conventionally prepared from alkali cyanides and chlorine, for example by introducing chlorine into a concentrated aqueous alkali cyanide solution at 0° C.

As mentioned, cyanogen chloride polymerizes to trimeric cyanuric chloride. A technique for this trimerization is described in U.S. Patent 2,491,459, for example, and involves the passage of cyanogen chloride over an actice charcoal catalyst at temperatures of at least 205° C. According to German Patent 1,068,265, cyanuric chloride is prepared directly by passing cyanogen and chlorine in equimolar quantities over activated charcoal at 350° to 750° C.

According to the present invention, it has been found that cyanogen chloride can be prepared in a simple manner in high yield and great purity by passing cyanogen and chlorine over a catalyst of charcoal treated with a metal salt, at temperatures of at least 200° C. In view of the processes taught in U.S. Patent 2,491,459 and German Patent 1,068,265 mentioned above, it is surprising that monomeric cyanogen chloride, rather than trimeric cyanuric chloride, is predominantly produced by the process of the invention. The treatment of a charcoal catalyst with metal salts is critical to the present invention, since the use of an untreated catalyst, as in prior art methods, favors the direct formation of trimeric cyanuric chloride or the trimerization of cyanogen chloride.

In contrast with known methods for preparing cyanogen chloride from an alkali cyanide and chlorine, the process of the present invention has the advantage that two mols of cyanogen chloride are formed from one mol each of chlorine and cyanogen:

$$Cl_2 + (CN)_2 \rightarrow 2CNCl$$

According to known processes, half of the reacted chlorine appears as an uneconomic by-product, e.g.:

$$Cl_2 + NaCN \rightarrow CNCl + NaCl$$

As salts which can be used for treating charcoal to prepare a catalyst according to the present invention, chlorides, sulfates, and acetates of the alkali metals and chlorides of the alkaline earth metals, such as sodium chloride, magnesium chloride, calcium chloride, sodium acetate, sodium sulfate, and potassium sulfate can be mentioned as exemplary, as well as materials such as zinc chloride and aluminum sulfate. The salts alone have no catalytic activity, but must be used in the presence of charcoal as a treating agent for the latter.

For the preparation of the catalyst, charcoal or activated charcoal is simply moistened with an aqeuous solution of such a salt, or with a solution of several of such salts, and is subsequently dried. In general, the amount of salt applied to the charcoal is such to give a deposit of from about 5 percent to about 20 percent, preferably from about 5 percent to about 10 percent, of salt by weight of the charcoal-salt catalyst. In general, the greater the concentration of salt present in the catalyst at a given temperature, or the higher the reaction temperature when a given salt concentration is employed in the catalyst, the greater will be the yield of cyanogen chloride in the reaction product, either in terms of absolute yield or in comparison with minor amounts of cyanuric chloride which may be formed.

The cyanogen and chlorine reactants are conveniently passed over the catalyst in the equimolar amounts. When yields are high this has the advantage that unreacted reactants need not be separated from the reaction product. When less efficient catalysts are used, or when the reaction is carried out at temperatures not giving substantially 100 percent yields, the yield of cyanogen chloride may be increased by employing an excess of one or the other of the reactant gases.

Since the reaction under consideration involves no volume change, there is no particular advantages to working at sub- or super-atmospheric pressures. Although the reaction will take place as described at such pressures, it is most convenient to operate at atmospheric pressures, where no special equipment is needed. The reactant gases are contacted with the catalysts at temperatures of from about 200° C. to about 600° C., preferably at temperatures of from about 350° C. to about 600° C. The cyanogen chloride formed can be conveniently recovered from the gaseous reaction product by chilling it to a temperature of about −10° C. to crystallize the cyanogen chloride.

A better understanding of the present invention and of its many advantages will be had by referring to the following specific example, given by way of illustration.

Example

About equimolar amounts of chloride and cyanogen (212 cm.³ each, measured at 20° C.) were passed through a heated quartz tube having an inside diameter of 26 mm. in which 250 cm.³ (100 gm.) of a treated charcoal catalyst were found. In each case, the charcoal catalyst was prepared by contacting active charcoal with a salt solution and drying. The gaseous products leaving the reaction tube were cooled to a temperature of about −10° C. to recover crystallized cyanogen chloride. The results obtained under different conditions of temperature and with different catalysts are summarized below in Table I.

TABLE I

| Catalyst Contains— | Reaction Temperature (° C.) | Amount of Cyanuric Chloride Formed, Percent | Yield of Cyanogen Chloride, Percent |
|---|---|---|---|
| 5% $ZnCl_2$ | 460 | 5.9 | 82.4 |
| 10% $ZnCl_2$ | 380 | | 10.6 |
| 10% $ZnCl_2$ | 450 | | 70.8 |
| 10% $ZnCl_2$ | 560 | | 100.0 |
| 12% NaCl | 560 | | 84.6 |
| 10% $CaCl_2$ | 560 | | 100.0 |
| 8% $MgCl_2$ | 560 | | 98.2 |
| 10% $Al_2(SO_4)_3$ | 560 | | 99.1 |
| 15% $CH_3COONa$ | 560 | | 90.4 |
| 10% $Na_2SO_4$ | 560 | | 100 |
| 20% $K_2SO_4$ | 560 | | 74.2 |

Although specific embodiments have been shown and described, it is to be understood that they are illustrative, and are not to be construed as limiting on the scope and spirit of the invention.

What is claimed is:

1. A method for preparing cyanogen chloride which comprises passing cyanogen and chlorine over a charcoal catalyst having a metal salt deposited thereon, at a temperature of at least 200° C.

2. A method as in claim 1 wherein said metal salt is a member selected from the group consisting of alkali metal chlorides, sulfates, and acetates, alkaline earth metal chlorides, zinc chloride, and aluminum sulfate.

3. A method as in claim 2 wherein said temperature is between about 200° C. and about 600° C.

4. A method as in claim 2 wherein said temperautre is between about 350° C. and about 600° C.

5. A method as in claim 2 wherein said cyanogen and chlorine are present in about equimolar amounts.

6. A method for preparing cyanogen chloride which comprises passing about equimolar amounts of cyanogen and chlorine over a charcoal catalyst having a metal salt deposited thereon, said metal salt being selected from the group consisting of alkali metal chlorides, sulfates, and acetates, alkaline earth metal chlorides, zinc chloride, and aluminum sulfate, at a temperature between about 200° C. and about 600° C.

7. A method as in claim 6 wherein said metal salt comprises between about 5 percent and about 20 percent by weight of said catalyst.

8. A method as in claim 6 wherein said temperature is between about 350° C. and about 600° C.

9. A method as in claim 6 wherein the cyanogen chloride formed is recovered in crystalline form by cooling the gaseous reaction product to a temperature of about $-10°$ C.

References Cited by the Examiner

UNITED STATES PATENTS 3,101,334   8/1963   Friedrich _____ 23—75 X

FOREIGN PATENTS 890,268   2/1962   Great Britain.

BENJAMIN HENKIN, *Primary Examiner.*

MAURICE A. BRINDISI, *Examiner.*

R. M. DAVIDSON, M. WEISSMAN,
*Assistant Examiners.*